United States Patent Office 3,186,960
Patented June 1, 1965

3,186,960
METHOD OF PREPARING MIXTURES CONTAINING AN AMINE ACCELERATOR
Jacob A. Knots, Zaandam, Netherlands, assignor to Adriaan Honig's Kunsthars-Industrie N.V., Zaandam, Netherlands, a limited-liability company of the Netherlands
No Drawing. Continuation of application Ser. No. 826,904, July 14, 1959. This application July 11, 1962, Ser. No. 209,242
Claims priority, application Netherlands, July 19, 1958, 229,750
5 Claims. (Cl. 260—24)

This is a continuation of my U.S. patent application Serial No. 826,904, filed June 14, 1959, now abandoned.

The present invention relates to a method of preparing a stable, solid composition useful for the acceleration of the polymerization of an unsaturated polyester and a styrene monomer.

It is known that the polymerization of mixtures of an unsaturated polyester and a monomer having one or more polymerizable $CH_2=C$ groups is accelerated by the catalytic effect of a hardening agent, i.e. benzoyl peroxide, if desired in combination with an accelerator. The hardening agent initiates the reaction and the accelerator causes the polymerization to proceed considerably more quickly, even at room temperature.

The action of benzoyl peroxide, for instance, is accelerated by an amine accelerator, such as dimethyl aniline and bis-(p-N,N'-dimethylamino-phenyl)methane.

For commercial use, the polymerizable mixture may also contain a solid inert filler.

It is desirable to reduce the components used in the polymerization of a mixture of an unsaturated polyester and a styrene monomer to a minimum number of components which have to be stored separately. Evidently, it is quite impossible to store the four constituents, i.e. the unsaturated polyester plus the copolymerizable monomer, the hardening agent, the accelerator and the filler, together in one container because hardening would begin immediately. But packing the four constituents in two separate containers has also caused many difficulties and none of the combinations suggested heretofore has given complete satisfaction.

Storing the unsaturated polyester and the polymerizable monomer (hereinafter jointly referred to as "polyester resin") together with the hardening agent without the accelerator is impossible, even when a filler is added to this mixture.

If the polyester resin and the amine accelerator were stored together, the mixture usually has little stability although the mixture containing the other components, namely the hardening agent and the filler, is stable over extended periods.

If one tries to store the above-mentioned mixtures of polyester resin and accelerator together with the filler, the combination still gels in a short time.

Mixing the polyester resin with the filler obviously is admissible but the reaction between the hardening agent and the accelerator is very rapid and may even lead to explosions. This problem is not overcome by the addition of filler, as the resulting mixture is still unstable.

A method has now been found by which it is possible to prepare a stable composition of a benzoyl peroxide hardener and an amine accelerator for the hardener, which mixture is added prior to use to the polyester resin which is itself stable.

According to the invention, the amine accelerator is incorporated in a material which is solid at ordinary temperature, compatible with the polyester resin to be hardened and soluble therein, the thus obtained solid substance is pulverized and the pulverized substance is mixed with a benzoyl peroxide hardener. In this way, a storable solid composition comprising a solid dispersion of an amine accelerator in a solid material and a benzoyl peroxide hardener is obtained, which composition may be mixed with a filler, if desired. The normally solid material is a rosin-modified maleic anhydride resin or an oil-soluble novolak resin.

Novolaks are fusible thermoplastic phenol-formaldehyde resins obtained when a slightly higher molar ratio of phenol than formaldehyde is used (A Manual of Plastics and Resins, 1950, Chemical Publishing Co., Inc., Brooklyn, N.Y.).

Using the storable composition for the polymerization of polyester resin, the system can be divided into a two component system, one component of the system containing the above-indicated storable solid composition and, if desired, a filler, and the second component consisting of the copolymerizable mixture of a polymerizable unsaturated polyester and of a styrene monomer.

This system can be used for the manufacture of hardened resinous products which may or may not contain a filler. In the absence of a filler or in the presence of a small amount of filler, moldable masses are obtained which may be cast and hardened into shaped articles.

As a result of the presence of the solid material in the composition according to the invention, contact between the amine accelerator and the peroxidic hardener is prevented but when the first component which contains the amine accelerator dispersed in the solid material is added to the second component containing the polyester resin, the solid material dissolves and, as a result, the peroxidic hardener comes into contact with the polyester resin and the amine accelerator and the polymerization reaction starts.

The solid material is pulverized after the amine accelerator has been incorporated therein because the powder dissolves more quickly in the polyester resin than coarse lumps.

The solid material should not be tacky after the incorporation of the amine accelerator.

In order that those skilled in the art may more fully understand the inventive concept herein presented, the following examples are given by way of illustration and not limitation of the invention. All parts are by weight.

*Example 1*

3 parts of dimethylaniline are molten together with 97 parts of a rosin-modified maleic anhydride resin having a capillary melting point of 126–132° C. After cooling, the composition is pulverized. Its capillary melting point is 105–113° C. 100 parts of an asbestine filler are mixed with 0.8 part of benzoyl peroxide powder and 20 parts of the pulverized composition. After 6 months, this composition is mixed with 60 parts of "Lamellon 23" unsaturated polyester and 40 parts of vinyl toluene. A paste-like mass is obtained, which hardens after 20 minutes at room temperature.

The rosin-modified maleic anhydride resin was prepared as follows:

To 100 parts of rosin, heated to 170° C., are added 6 parts of maleic anhydride. After keeping this mixture at this temperature for one hour, 20 parts pentaerythritol are added. The temperature is raised to 290° C. and held there until the acid number is lowered to 20.

*Example 2*

10 parts of bis-(p-N,N'-dimethylaminophenyl)methane are molten together with 90 parts of an oil-soluble novolak resin. This novolak resin is prepared by heating at reflux temperature for three hours a mixture of one mole of paratertiary-butyl phenol and 0.9 mole of aqueous formaldehyde in the presence of 0.8 percent of oxalic acid, based on the total weight, the water being distilled off and the heating being continued until the resin had a softening point of 75° C., as determined by the ring and ball method. After cooling, this composition of the novolak resin and the amine is pulverized.

20 parts of this powder are mixed with 100 parts of burnt gypsum and 0.8 part of benzoyl peroxide powder. After 6 months, this composition is mixed with 120 parts of "Lamellon 23" containing styrene. A moldable mass, which is hard after 14 minutes, is obtained.

"Lamellon 23" is an unsaturated polyester resin consisting of an unsaturated polyester dispersed in a reactive monomer. It belongs to the group of thermosetting materials curable by the addition of a catalytic hardening agent and, desirably, an accelerator, and the companys 1958 pamphlets, "Lamellon 23" is a clear, viscous resin, almost water-white in color, having a viscosity at 20° C. of 17–20 p., a specific gravity of 1.138 and a refractive index of 1.53–1.54 at that temperature. Its acid number is 28–32.

The polyester component of "Lamellon 23" is prepared by heating one mole of maleic acid, one mole of phthalic acid and two moles of propylene glycol at a temperature gradually rising to 200° C. During the esterification, water is distilled off and the reaction is continued until the acid number is lower than 45. At this point, the resin is cooled to 90° C., at which temperature the polyester is dissolved in the styrene monomer at the rate of 70 parts of polyester to 30 parts of styrene monomer.

What is claimed is:

1. A method of preparing a stable, solid composition containing benzoyl peroxide and an amine accelerator selected from the group consisting of dimethyl aniline and bis-(p-N-N'-dimethylaminophenyl)methane, comprising the steps of incorporating said amine accelerator into a solid material selected from the group consisting of a rosin-modified maleic anhydride resin and an oil-soluble novolak resin, pulverizing the resultant solid material and mixing said pulverized material with said benzoyl peroxide.

2. The method of claim 1, wherein said amine accelerator is incorporated into said solid material by melting the accelerator and the material together.

3. The method of claim 1, wherein three parts, by weight, of said dimethyl aniline is incorporated into 97 parts, by weight of said rosin-modified maleic anhydride resin by melting them together.

4. The method of claim 1, wherein 10 parts, by weight of said bis-(p-N,N'-dimethylaminophenyl)methane is incorporated into 90 parts, by weight of said oil-soluble novolak resin by melting them together.

5. The method of claim 1, wherein 10 parts by weight of said bis-(p-N,N'-dimethylaminophenyl)methane is incorporated into 90 parts by weight of said rosin-modified maleic anhydride resin by melting them together.

No references cited.

LEON J. BERCOVITZ, *Primary Examiner.*